Patented Oct. 5, 1948

2,450,771

UNITED STATES PATENT OFFICE 2,450,771

PLASTIC SULFUR VULCANIZING AGENT, METHOD FOR ITS UTILIZATION AND VULCANIZABLE COMPOSITIONS CONTAINING THE SAME

William E. Vaughan, Berkeley, and Benjamin Barnett, San Francisco, Calif., assignors to Shell Development Company, San Francisco, Calif., a corporation of Delaware No Drawing. Application March 6, 1944, Serial No. 525,306

11 Claims. (Cl. 260—79)

This invention relates to the compounding of plastic substances, particularly rubber-like organic substances, with plastic sulfur.

Powdered sulfur ("rubber makers' sulfur") has been used extensively as a vulcanizing agent in the compounding of elastomers. In the case of natural rubber the material is relatively satisfactory. In synthetic elastomers, however, such as polymers and co-polymers of diene hydrocarbons, powdered sulfur is difficult to disperse and tends to crystallize out, causing "bloom." Compositions in which the sulfur is poorly dispersed tend to have poor physical properties. Another disadvantage is that synthetic rubber compositions containing powdered sulfur are sensitive to the time of cure, i. e. the duration of vulcanization. Other forms of sulfur are unsatisfactory for the same or different reasons.

An object of the present invention is to facilitate the compounding of elastomers. Another object is to provide for the easier incorporation of sulfur with elastomers. Another object is to provide improved vulcanizing agents for elastomers. Another object is to provide elastomer compositions having flat curing characteristics and reduced tendency to bloom. Another object is to provide for the vulcanization of vulcanizable substances in general. Other objects will be apparent from the description of the invention given hereinafter.

These objects are accomplished by the compounding and vulcanizing of elastomers and other plastic substances with stable plastic sulfur compositions produced by subjecting a mixture of an organic compound, oxygen and hydrogen sulfide or a mercaptan to the action of an elevated temperature below that at which spontaneous combustion of the mixture occurs. Plastic sulfur compositions so produced consist principally of amorphous sulfur containing a small amount of organic sulfides, polysulfides or the like of such a nature and in such concentrations as to stabilize the sulfur against crystallization for long periods of time. The plastic sulfur can be readily dispersed in natural and synthetic elastomer compositions. Such compositions when vulcanized exhibit enhanced freedom from bloom. More importantly, the compositions have relatively flat curing characteristics, i. e. the physical properties of the compositions are relatively independent of the time of cure.

The plastic sulfur with which the invention is concerned can be produced by heating a mixture of hydrogen sulfide or a mercaptan, oxygen and an aliphatic, alicyclic, aromatic hydrocarbon or partially halogenated product thereof. In addition to plastic sulfur, there are produced in the process various oxygenated and oxidized organic compounds which may or may not contain the same number of carbon atoms per molecule as the starting organic material.

Representative organic compounds of the class which may be used in the production of the novel plastic sulfur include: saturated and unsaturated aliphatic hydrocarbons, such as methane, ethane, propane, normal butane, isobutane, the straight- and branched-chain pentanes, hexanes, heptanes, octanes and the like, ethylene, butylenes, amylenes and their homologues; the alicyclic hydrocarbons such as cyclopropane, cyclobutane, cyclopentane, the higher homologues thereof and the alkylated cycloparaffins such as methyl cyclopentane, methyl cyclohexane, and the like; the aryl and aralkyl hydrocarbons such as benzene, naphthalene, toluene, xylenes, ethyl benzene, mesitylene, n-propyl benzene, tertiary butyl benzene, diphenyl methane, cymene, and the like; and the partially halo-substituted normal and branched-chain saturated aliphatic, alicyclic and aromatic hydrocarbons such as ethyl chloride, dichlorethane, mono- and di-chlorinated propanes, mono- and di-brominated propanes, mono- and di-chlorinated butanes, monochlorcyclopentane, benzyl chloride, benzyl bromide, and their homologues and analogues. Also, various hydrocarbon fractions, and particularly the lower-boiling hydrocarbon fractions, may be employed as the starting organic compound. As stated, other derivatives of the above-defined class of hydrocarbons such as the corresponding aldehydes, ketones, ethers, nitriles, etc., also fall within the class of compounds which may be employed together with oxygen and hydrogen sulfide or mercaptans as the primary material.

The reaction is effected at temperatures which are below those at which spontaneous combustion and the resultant formation of large amounts of carbon occur. This upper temperature limit will depend on a number of variables such as the specific organic substance treated, the proportions thereof as well as of the oxygen and the hydrogen sulfide present in the mixture subjected to the elevated temperatures, and the residence time. No specific upper and lower operating temperatures may be stated since, as pointed out, they differ depending on a number of variables. However, except in the cases of very long residence periods, the lower temperature should be above about 250° C., while the uper temperature limit, except for very stable hydrocarbons, should not exceed about 350° C. The treatment of mixtures containing the above outlined class of organic compounds, e. g. hydrocarbons, as well as molecular oxygen and hydrogen sulfide may be effected in the liquid or vapor phase or in a two-phase liquid-vapor system. The volumetric ratio of the organic starting material to the oxygen may vary within relatively wide limits. It may be generally stated that the use of equivolumetric amounts of oxygen and the organic starting material results in the formation of satisfactory yields of the desired products, although higher or lower ratios may be used.

The amount of hydrogen sulfide or of the mercaptan employed may also vary within relatively wide limits. When the hydrogen sulfide concentration is varied from zero to about 20% or 25%, there is a proportional and noticeable change in the percentage of oxygen which reacts with the organic starting material. Further increases in the concentration of the hydrogen sulfide, however, do not have any marked and noticeable effect on the percentage of oxygen which will react. Very high hydrogen sulfide concentrations will cause excessive dilution and thus decrease the output of the oxidized product or products. However, for a given oxygen flow it is possible by alteration of the relaitve flows of the hydrogen sulphide (or of the mercaptans) and that of the organic starting materials to increase the amount of the novel plastic sulfur compounds at the expense of the products of oxidation of the organic starting materials. Under all reaction conditions the major portion of the sulfur of the reacting sulphur compounds (H₂S and/or mercaptans) appears in the final product as the novel plastic sulfur compounds.

The treatment of the starting mixtures in accordance with the process of the present invention may be effected at atmospheric pressures, although higher or lower pressures may also be employed. In fact, it is generally preferable to use superatmospheric pressure because more of the mixture subjected to treatment may be present in or conveyed through a given unit of reaction space per unit of time.

The invention may be executed in a batchwise, intermittent or continuous manner. Instead of using pure or substantially pure oxygen for the oxidation of the organic starting material, it is also possible to employ oxygen-containing mixtures such as air, or even substances capable of yielding molecular oxygen under the operating conditions. Also, although the examples presented hereinbelow are directed specifically to the use of hydrogen sulfide, the process of the present invention may also be realized by using mercaptans and particularly the alkyl mercaptans such as methyl mercaptan, ethyl mercaptan, and the like, or even substances capable of yielding hydrogen sulfide or mercaptans under the operating conditions. Furthermore, mixtures comprising hydrogen sulfide and one or more mercaptans may also be employed.

The plastic sulfur compositions produced in accordance with the method described hereinabove are stable, i. e., retain their plasticity, for long periods of time. Plastic sulfur prepared in the usual ways retains its plasticity for only short periods of time, for instance, one or two days. The novel plastic sulfur compounds of the present invention may retain their plasticity for six months or more.

The plastic sulfur compositions with which the invention is concerned consist principally of amorphus sulfur admixed with a small percentage, e. g. 5%, of organic sulfides, polysulfides, and the like.

The new plastic sulfur compositions can be used as vulcanizing agents for substantially all plastic substances containing unsaturated carbon-to-carbon linkages. One group of such substances consists of many natural and synthetic plastics produced by the polymerization of compounds containing polymerizable unsaturated carbon-to-carbon linkages. Plastics containing residual unsaturation may sometimes be produced from compounds containing in the molecule a single polymerizable olefinic linkage. More usually the starting compounds should contain more than one polymerizable unsaturated carbon-to-carbon linkage. One group consists of unconjugated polymerizable compounds having in the molecule two or more ncn-conjugated polymerizable unsaturated linkages such as unsaturated aliphatic polyesters of saturated polybasic acids, polyesters of saturated polyhydric alcohols with unsaturated organic acids, and esters of unsaturated monohydric alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group consists of those having in the molecule two or more, preferably two, conjugated unsaturated polymerizable carbon-to-carbon linkages, such as conjugated butadiene, conjugated chlorobutadiene, isoprene, the other conjugated pentadienes, the conjugated hexadienes, their homologues, analogues and suitable substitution products.

The latter group of compounds is among those used in the production of synthetic elastomers. Any or all of the above and other polymerizable compounds can be polymerized alone or in admixture with one or more other polymerizable compounds. Important co-polymers are those of one or more diene hydrocarbons with one or more compounds containing in the molecule a polymerizable unsaturated carbon-to-carbon linkage not in conjugated relationship with any other polymerizable unsaturated carbon-to-carbon linkage. Of these an important subgroup consists of co-polymers of butadiene and acrylonitrile. The percentage of acrylonitrile in such co-polymers is ordinarily between about 10% and about 40% by weight of the total, although not necessarily limited to this range. Another important subgroup consists of co-polymers of butadiene and styrene. Others are co-polymer of isobutylene with a small amount of a conjugated diene. Particularly valuable synthetic elastomers are producers by the polymerization of 2-methyl-1, 3-pentadiene and 4-methyl-1, 3-pentadiene alone or in admixture with other polymerizable compounds. The invention applies also to natural rubber; to compositions comprising both synthetic rubber and reclaimed rubber; to compositions comprising either synthetic rubber or reclaimed rubber, and to mixtures of the three types of rubber, synthetic, reclaimed and natural.

The invention is not to be considered limited to the examples of synthetic rubber listed above since it appears applicable to all vulcanizable synthetic substances having the approximate physical properties of natural rubber and to other vulcanizable substances. The term "synthetic rubber" as used in this application is substantially equivalent to "elastomer," as suggested by H. L. Fisher, Ind. Eng. Chem. 31, 941 (1939), or to "synthetic elastomer."

In addition to plastic sulfur and one or more elastomers, the compositions of the invention ordinarily contain other modifying substances.

Tackifying and plasticizing substances are common adjuvants. Common plasticizers are dibutyl phthalate, dioctyl phthalate, tricresyl phosphate, triacetin, tetralin, soft coal tar, cumar resins, soft factice, wool grease, stearic acid, lauric acid, and waxes. Excellent tackifiers are higher unsaturated cyclic ketones and the hydrogenation products thereof, as described and claimed in the copending application of Thornhill and Perona, Serial No. 490,946, filed June 14, 1943. Others are resins produced by reacting higher ketones with aldehydes, as described and claimed in the copending application of Ballard and Perona, Serial No. 490,947, filed June 14, 1943, now Patent No. 2,410,623. The unsaturated hydrocarbon product obtained from lubricating oil acid sludge can be used. Extraction products of bulk distillate are likewise effective. Most of the above and other agents exert a plasticizing as well as tackifying action upon synthetic elastomers.

One or more anti-oxidants are ordinarily present, the most common one being phenyl beta-naphthyl amine. Illustrative of other anti-oxidants useful in synthetic and reclaimed rubber are p-hydroxy diphenyl, hydroquinone, p-amino-phenol, p,p'-diamino-diphenylmethane, 2,4-n-toluylene diamine, diphenylamine, o-ditolylamine, p-ditolylamine, phenyl alpha-naphthyl amine, phenyl beta-naphthyl-nitroso amine, symmetrical di-beta-naphthyl-p-phenylene diamine, diphenyl diamino ethane and 2,4-diaminodiphenylamine.

With both natural rubber and synthetic elastomers carbon black is made an ingredient of the compositions because it acts not only as a filler and stiffener but also, and more important, as an agent to increase the tensile strength. The choice of type of carbon black will depend upon many factors, principally the nature of the synthetic and the purpose of the composition. Soft and hard channel black, thermal decomposition black and semi-reinforcing furnace black are common types. The properties of the composition may be modified with other pigments, such as iron oxide, titanium dioxide, barytes, zinc oxide, hydrated alumina, lithopone, and whiting.

In addition to plastic sulfur produced as hereinbefore described, there may be present powdered sulfur, or sulfur in one or more other forms. Other vulcanizing agents which can be present include sulfur-containing compounds, such as sulfur chloride, hydrogen sulfide and sulfur thiocyanate; oxygen and oxygen yielding compounds, such as ozone, organic inorganic peroxides; selenium, halogens and halogen-containing compounds, and; nitrogen-containing compounds, such as the nitrobenzenes.

In addition to vulcanizing agents, vulcanizing accelerators may be added. Illustrative examples of accelerators are tetramethyl thiuram disulfide, zinc dibutyl dithiocarbamate, tetramethyl thiuram monosulfide, dipentamethylene-thiuram tetrasulfide, mercapto benzo thiazole, hexamethylene-tetramine, aldehyde-ammonia, diphenylguanidine, diphenylthiourea, benzo thiazyl disulfide, piperidinium pentamethylene-dithiocarbamate, di-o-tolylguanidine, triphenylguanidine and lead dimethyldithiocarbamate. Some of these are considerably more effective than others. Zinc oxide is usually added, its action being that of an inorganic accelerator, or an activator of vulcanization accelerators.

The compounded compositions can be subjected to the numerous shaping operations known in the art. Sheets can be formed by calendering on heated rolls or by casting from solutions. Sheets, rods, tubes and coatings can be formed by continuous or discontinuous extrusion. Articles of substantially any shape can be made by operations using open or closed molds. The compositions can be applied to fibrous material, such as fabric, by calendering or by impregnation with a suitable emulsion.

The vulcanization of the compositions of the present invention takes place under conditions similar to those used with compositions prepared with powdered sulfur. In substantially all cases vulcanization of compositions containing the requisite components occurs slowly at room temperature, and is accelerated by increase in temperature. The upper limit of the temperature of vulcanization is ordinarily determined only by the degradation or decomposition of the material, or by the volatility of one or more of its constituents.

The synthetic, natural and reclaimed rubber compositions of the present invention can be used for all of the purposes to which other such compositions are applied. Examples which come readily to mind are balloon coverings, umbrellas, raincoats, table covers, shower curtains and garment bags, for which cloth impregnated with synthetic rubber has been found highly suitable; electrical insulation; friction tape; hose for the handling of aqueous substances, of petroleum products and of paints; lining and exterior coating in self-sealing gasoline tanks; gaskets; belts for conveying and for the transmission of power; vibration dampeners, for which several synthetics are ideal by virtue of their high absorption of energy; printers rolls, printers blankets and engraving plates; shoe soles and heels; aprons; gloves; gas masks and clothing resistant to the penetration of poisonous gases. The most prominent example is the use of synthetics in automobile tire tubes and tire casings.

The invention can be illustrated by the following examples in which parts are based on weight:

Example 1

A gaseous mixture of butene-2, oxygen and hydrogen sulfide was passed through a reactor. The volumetric ratio of the reactants was 2:2:1 respectively. The residence time was 13.3 seconds. The reaction was effected at substantially atmospheric pressure at a temperature of about 340° C. The following mole percentages of the introduced substances reacted

|  | Mol percent |
|---|---|
| Butene-2 | 50 |
| Oxygen | 85.1 |
| $H_2S$ | 67.6 |

The product comprised liquid and solid material. The solid material was a yellow-to-deep red stable plastic sulfur composition having the following analysis:

|  | Percent |
|---|---|
| C | 8.1 |
| H | 1.6 |
| S | 82.1 |

The plastic sulfur produced as above-described was compounded in accordance with the recipe given below with a copolymer of about 3 parts of butadiene and 1 part of styrene.

| | Parts |
|---|---|
| Copolymer | 100 |
| Carbon black | 50 |
| Coal for plasticizer [1] | 5 |
| Mercaptobenzothiazole | 1.5 |
| Zinc oxide | 5 |
| Plastic sulfur | 2 |

[1] A refined coal tar oil plasticizer the properties of which are described in Compounding Ingredients For Rubber (1936), p. 109.

For comparison another batch was compounded with otherwise identical ingredients using powdered sulfur ("rubber makers' sulfur") in place of plastic sulfur. Samples were cured at 145° C. for various periods. The physical properties of the cured specimens were determined as follows:

| Cure, min. | Copolymer with plastic sulfur | | | | GR-S with powdered sulfur | | | |
|---|---|---|---|---|---|---|---|---|
| | Tensile Str., p. s. i. | Elong., Percent | Modulus, p. s. i. | Perm. Set., Percent | Tensile Str., p. s. i. | Elong., Percent | Modulus, p. s. i. | Perm. Set., Percent |
| 20 | 2,830 | 634 | 900 | 17 | 2,205 | 618 | 700 | 22 |
| 30 | 2,935 | 519 | 1,500 | 13 | 2,655 | 544 | 1,120 | 17 |
| 45 | 2,960 | 508 | 1,300 | 11 | 2,845 | 452 | 1,610 | 13 |
| 60 | 2,840 | 438 | 1,700 | 10 | 2,785 | 400 | 1,810 | 8 |
| 90 | 2,930 | 450 | 1,640 | 7 | 2,805 | 384 | 2,000 | 7 |

*Example II*

A preheated mixture of ethane, oxygen and hydrogen sulfide was conveyed through a tubular reactor at a rate of 49 cc. per minute of ethane, 171 cc. per minute of oxygen and 194 cc. per minute of hydrogen sulfide. The temperature was 300° C., the residence time was equal to about 13 seconds. Approximately 85 mol percent of the hydrogen sulfide reacted to form a stable plastic sulfur.

The plastic sulfur is compounded with a polymer of 2-chloro-butadiene in accordance with the formula given below, the ingredients being added in the order listed.

| | Parts |
|---|---|
| A polymer of 2-chloro-butadiene | 100 |
| Magnesium oxide | 4 |
| Tetrachloroisopropyl ether | 10 |
| Phenyl beta-naphthylamine | 2 |
| Soft carbon black | 35 |
| Channel black | 15 |
| Plastic sulfur | 1 |
| Zinc oxide | 5 |

The composition is vulcanized at about 153° C.

*Example III*

A mixture of methane, oxygen and hydrogen sulfide in the volumetric ratio of 2:2:1 was reacted at 400° C. with a residence time of about 1.75 minutes. The following percentages of the introduced substances reacted:

| | Mol percent |
|---|---|
| Methane | 46 |
| Oxygen | 97 |
| Hydrogen sulfide | 95 |

Approximately 82 mol percent of the reacted hydrogen sulfide is converted to plastic sulfur which is subsequently compounded with neoprene in accordance with Example II.

*Example IV*

Isobutane, oxygen and hydrogen sulfide were reacted in a volumetric ratio of 2:2:1 at 300° C. with a residence time of 13 seconds. The following percentages of the introduced materials reacted:

| | Mol percent |
|---|---|
| Isobutane | 53 |
| Oxygen | 91 |
| Hydrogen sulfide | 63 |

Of the reacted hydrogen sulfide approximately 97 mol percent was recovered in the form of a stable plastic sulfur.

The plastic sulfur produced as above-described is compounded with a co-polymer of butadiene and acrylonitrile, in accordance with the following recipe:

| | Parts |
|---|---|
| A copolymer of butadiene and acrylonitrile | 100 |
| Phenyl beta-naphthylamine | 1 |
| Benzothiazyl disulfide | 1.25 |
| Dibutyl phthalate | 25 |
| Zinc oxide | 5 |
| Channel black | 50 |
| Stearic acid | 0.5 |
| Plastic sulfur | 1.25 |

The composition is vulcanized at about 145° C. for 30 minutes.

*Example V*

A mixture of ethyl benzene, oxygen and hydrogen sulfide was conveyed through a reactor having a volume equal to about 120 cc. at a rate of about 48 cc. per minute of ethyl benzene, about 82.4 cc. per minute of oxygen and about 41 cc. per minute of hydrogen sulfide. The reaction was effected at atmospheric pressure and at about 300° C. About 50% of the introduced hydrogen sulfide reacted to form a very stable and highly plastic sulfur compound, which is incorporated with a copolymer of butadiene and acrylonitrile in accordance with the recipe given in the preceding example.

*Example VI*

Toluene, oxygen and hydrogen sulfide in a volumetric ratio of 2:2:1 were reacted at atmospheric pressure at a temperature of about 340° C. with a residence time of about 53 seconds. The following percentages of the introduced substances reacted:

| | Mol percent |
|---|---|
| Toluene | 17 |
| Oxygen | 19 |
| Hydrogen sulfide | 23 |

About 87 mol percent of the reacted hydrogen sulfide was recovered as a stable plastic sulfur composition.

The plastic sulfur produced as above-described is used in compounding a co-polymer of about 75 parts of butadiene with about 25 parts of styrene in accordance with the following formula:

| | Parts |
|---|---|
| Butadiene/styrene co-polymer | 100 |
| Soft coal tar | 10 |
| Phenyl beta-naphthylamine | 1 |
| Benzothiazyl disulfide | 1.25 |
| Zinc oxide | 5 |
| Stearic acid | 1 |
| Channel black | 50 |
| Plastic sulfur | 1.5 |

We claim as our invention:

1. A vulcanizable composition comprising a butadiene polymer and a vulcanizing agent which is a stable plastic sulfur composition produced by subjecting a normally gaseous aliphatic hydrocarbon, oxygen and hydrogen sulfide to an elevated temperature in the range of from 250° C. to 350° C., and substantially atmospheric pressure.

2. A vulcanizable composition comprising a co-polymer of butadiene with some other polymerizable unsaturated organic compound and a vulcanizing agent which is a stable plastic sulfur composition produced by subjecting a normally gaseous aliphatic hydrocarbon, oxygen and hydrogen sulfide to an elevated temperature in the range of from 250° C. to 350° C. at substantially atmospheric pressure.

3. A vulcanizable composition comprising a vulcanizable organic plastic substance containing unsaturated carbon to carbon bonds and a vulcanizing agent which is a stable plastic sulfur composition produced by subjecting a mixture comprising an aliphatic hydrocarbon, oxygen and a compound selected from the group consisting of hydrogen sulfide and mercaptans to an elevated temperature in the range of from 250° C. to 350° C., at substantially atmospheric pressure.

4. A vulcanizable composition comprising natural rubber and a vulcanizing agent which is a stable plastic sulfur composition produced by subjecting a mixture comprising an aliphatic hydrocarbon, oxygen and a compound selected from the group consisting of hydrogen sulfide and mercaptans to an elevated temperature in the range of from 250° C. to 350° C., at substantially atmospheric pressure.

5. A vulcanizable composition comprising a vulcanizable organic plastic substance containing unsaturated carbon to carbon bonds and a vulcanizing agent which is a stable plastic sulfur composition produced by subjecting a mixture comprising a normally gaseous aliphatic hydrocarbon, oxygen and a compound selected from the group consisting of hydrogen sulfide and mercaptans to an elevated temperature in the range of from 250° C. to 350° C., at substantially atmospheric pressure.

6. A vulcanizable composition comprising a vulcanizable organic plastic substance containing unsaturated carbon to carbon bonds and a vulcanizing agent which is a stable plastic sulfur composition produced by subjecting a mixture comprising a hydrocarbon, oxygen and a compound selected from the group consisting of hydrogen sulfide and mercaptans to an elevated temperature above 250° C. but below that temperature at which spontaneous combustion of the mixture occurs.

7. A vulcanizable composition comprising a vulcanizable organic plastic substance containing unsaturated carbon to carbon bonds and a vulcanizing agent which is a stable plastic sulfur composition produced by subjecting a mixture comprising a compound selected from the group consisting of hydrocarbons and partially halogenated hydrocarbons, oxygen and a compound selected from the group consisting of hydrogen sulfide and mercaptans to the action of an elevated temperature above 250° C. and below that temperature at which spontaneous combustion of the mixture occurs.

8. A vulcanizable composition comprising a vulcanizable organic plastic substance containing unsaturated carbon to carbon bonds and a vulcanizing agent which is a plastic sulfur composition produced by subjecting a mixture comprising a hydrocarbon, oxygen and a compound selected from the group consisting of hydrogen sulfide and mercaptans to an elevated temperature above 250° C. but below that temperature at which spontaneous combustion of the mixture occurs.

9. A vulcanizable composition comprising a vulcanizable organic plastic substance containing unsaturated carbon to carbon bonds and a vulcanizing agent which is a stable plastic sulfur composition produced by subjecting a mixture comprising a hydrocarbon, oxygen and a compound selected from the group consisting of hydrogen sulfide and mercaptans to an elevated temperature above 250° C. but below that temperature at which spontaneous combustion of the mixture occurs.

10. The method of producing a vulcanizate possessing flat curing characteristics which comprises heating a vulcanizable organic plastic substance containing unsaturated carbon to carbon bonds in intimate contact with stable plastic sulfur composition obtained by subjecting a mixture comprising a normally gaseous aliphatic hydrocarbon, oxygen and a compound selected from the group consisting of hydrogen sulfide and mercaptans to an elevated temperature in the range of from 250° C. to 350° C., at substantially atmospheric pressure.

11. The method of producing a vulcanizate possessing flat curing characteristics which comprises heating a vulcanizable organic plastic substance containing unsaturated carbon to carbon bonds in intimate contact with stable plastic sulfur composition obtained by subjecting a mixture comprising a hydrocarbon, oxygen and a compound selected from the group consisting of hydrogen sulfide and mercaptans to an elevated temperatutre in the range of from 250° C. to 350° C., at substantially atmospheric pressure.

WILLIAM E. VAUGHAN.
BENJAMIN BARNETT.

REFERENCES CITED

The following references are of record in the file of this patent:

UNITED STATES PATENTS

| Number | Name | Date |
|---|---|---|
| 1,875,372 | Endres | Sept. 6, 1932 |
| 2,137,584 | Ott | Nov. 22, 1938 |
| 2,184,076 | Gottesman | Dec. 19, 1939 |
| 2,298,641 | Schulze et al | Oct. 13, 1942 |